United States Patent [19]

Schumann et al.

[11] Patent Number: 5,427,623
[45] Date of Patent: Jun. 27, 1995

[54] CLEANING OF MACHINES FOR THE PRODUCTION AND PROCESSING OF PLASTICS

[75] Inventors: Werner Schumann, Pulheim; Werner Tischer; Werner Brennig, both of Dormagen, all of Germany

[73] Assignee: Bayer AG, Leverkusen, Germany

[21] Appl. No.: 79,698

[22] Filed: Jun. 18, 1993

Related U.S. Application Data

[63] Continuation of Ser. No. 681,959, Apr. 8, 1991, abandoned.

[30] Foreign Application Priority Data

Apr. 21, 1990 [DE] Germany .................. 40 12 798.2

[51] Int. Cl.⁶ .................. B08B 3/04; C11D 3/37
[52] U.S. Cl. .................. 134/7; 134/8; 134/22.11; 252/174.23; 252/DIG. 2; 252/DIG. 14
[58] Field of Search .................. 252/174.23, 174.24, 252/DIG. 2, DIG. 14; 134/7, 8, 22.11

[56] References Cited

U.S. PATENT DOCUMENTS

| | | | |
|---|---|---|---|
| 3,817,888 | 6/1974 | Johnson et al. | 524/828 |
| 4,302,371 | 11/1981 | Gurck et al. | 526/338 |
| 4,838,945 | 6/1989 | Fuji et al. | 252/174.23 |
| 4,838,948 | 6/1989 | Bailey | 134/8 |
| 4,976,788 | 12/1990 | Nohe et al. | 134/5 |
| 5,108,645 | 4/1992 | Obama et al. | 252/174.23 |
| 5,124,383 | 6/1992 | Obama et al. | 524/115 |

FOREIGN PATENT DOCUMENTS

| | | | |
|---|---|---|---|
| 5141004 | 4/1976 | Japan | 252/174.23 |
| 0124999 | 6/1984 | Japan | 252/174.23 |
| 0126440 | 7/1984 | Japan | 252/174.23 |
| 0127311 | 8/1985 | Japan | 526/338 |
| 1167353 | 3/1989 | Japan | 526/338 |
| 2308899 | 12/1990 | Japan | |

OTHER PUBLICATIONS

Abstract, Polymer Chemistry, Week (85)33, J60127312A, Dec. 13, 1993.

*Primary Examiner*—Paul Lieberman
*Assistant Examiner*—Kery Fries
*Attorney, Agent, or Firm*—Connolly & Hutz

[57] ABSTRACT

A cleaning preparation for machines for processing plastics, consisting of or containing a powder-form acrylonitrile/butadiene/styrene polymer containing 20 to 80% by weight water which has been obtained from a latex by precipitation with magnesium sulfate or sodium phosphate and a process for cleaning processing machines for plastics in which the cleaning preparation is fed into the processing machine.

6 Claims, No Drawings

CLEANING OF MACHINES FOR THE PRODUCTION AND PROCESSING OF PLASTICS

This application is a continuation of application Ser. No. 07/681,959 filed Apr. 8, 1991 now abandoned.

Plastics, particularly thermoplastic molding compositions, are generally produced and processed in continuously operated machines, including for example extruders, kneaders and injection-molding machines. These machines often have to be changed over from the production and processing of one molding compound to another. To this end, the old material has to be completely removed from the machines because any traces still present would contaminate the new material. This change-over of production is referred to hereinafter as cleaning.

For cleaning, machines of the type in question generally cannot be dismantled, mechanically cleaned and then reassembled because this would take far too long. For this reason, the machines are simply charged with the new material and the product is discarded as long as it contains old material. This does of course entail a considerable loss of time, energy and raw materials.

It has now been found that, in the event of a change-over of production, machines of the type in question can be cleaned much more quickly with considerably smaller losses of energy and raw materials when a powder-form acrylonitrile/butadiene/styrene polymer of high water content is introduced into the machine instead of or together with the new plastic to be processed. In this way, residues of the old plastic are removed from the machines in a very short time so that change-over to a new plastic can be carried out very quickly.

Accordingly, the present invention relates to a cleaning preparation for machines for processing plastics which consists of or contains a powder-form acrylonitrile/butadiene/styrene polymer having a water content of 20 to 80% by weight which has been obtained from a latex by precipitation with magnesium sulfate or sodium phosphate.

The present invention also relates to a process for cleaning machines for processing plastics which is characterized in that the machine is charged with a powder-form, water-containing acrylonitrile/butadiene/styrene polymer.

The cleaning preparation according to the invention can be produced by coagulation of an acrylonitrile/butadiene/styrene polymer latex with aqueous solutions of magnesium sulfate and/or sodium phosphate at elevated temperature and separation of the coagulate. A powder of high water content which may be directly used is obtained in this way. It may additionally contain other substances, such as alkalizing agents, abrasive particles, emulsifiers, surfactants. In the context of the invention, an acrylonitrile/butadiene/styrene polymer is preferably a graft polymer of acrylonitrile and styrene on polybutadiene which has been obtained by emulsion polymerization. The material is preferably free from typical additives, such as lubricants, stabilizers, pigments, fillers, dyes.

To clean a machine of the type in question, the cleaning preparation according to the invention is first introduced, generally together with the new plastic to be processed; the machine settings and processing conditions need not be changed.

For example, the cleaning preparation according to the invention may be added to the new plastic in quantities of, preferably, 1 to 10% by weight and the resulting mixture may be introduced into the machine to be cleaned. If the machine itself does not generate any pressure (for example venting extruders), an increase in pressure has to be briefly induced (in the case of venting extruders, by closure of the vent tube).

The cleaning preparation according to the invention is ABS-based. However, it may be used in virtually every instance of a change-over of production, even when neither the old material nor the new material is an ABS. Examples of plastics of which the processing machines can be cleaned are, for example, ABS, polyamide, polycarbonate, polyolefins (polyethylene, polypropylene), polymethyl methacrylate, polyphenylene sulfide, polystyrene, polyvinyl chloride, styrene/acrylonitrile copolymer and mixtures thereof.

The plastics may, but do not have to, contain fillers. To reduce the danger of corrosion of metal parts of the machines, the cleaning preparation is best adjusted to a pH of 7 to 14, for example by precipitating it with alkaline precipitants.

The described cleaning preparation is applied via the production of a mixture of cleaning preparation containing 20 to 80% by weight and preferably 40 to 60% by weight water and the plastics material to be subsequently processed in the machine. This mixture is produced simply by adding at least 0.5% by weight and preferably 1 to 10% by weight of the cleaning preparation with the new plastics material to be processed by manual or machine mixing. The mixture thus produced is introduced into the feed unit of the machine and processed with the machine settings unchanged.

EXAMPLE 1

10 kg of the latex of a graft polymer of styrene and acrylonitrile on polybutadiene (as obtained in industrial production) was precipitated in water with a 15% magnesium sulfate solution. The coagulate was filtered off. Its water content was 50% by weight. This material was directly used without further treatment as a cleaning preparation.

EXAMPLE 2

The cleaning preparation of Example 1 was tested during a color change from acrylonitrile/butadiene/styrene (ABS), black, to polycarbonate (PC), natural, in an injection-molding machine having a locking force of 20 t. To this end, 1 kg PC was mixed with 10 g cleaning preparation (corresponding to 1% by weight, based on the polycarbonate to be subsequently processed) and introduced into the injection molding machine via the feed unit at a screw speed of 250 r.p.m. The black ABS melt in the machine was injected into the open in less than five minutes. Transparent PC test specimens free from any color streaks or inclusions of old product could then be produced.

EXAMPLE 3

Further color changes were carried out as in Example 2 in injection molding machines having a locking force of 50 to 150 t. The quantities of cleaning mixture used had to be increased in accordance with the size of the machine. A machine having a locking force of 150 t required 2 kg polymer granules and 20 g cleaning preparation (1% by weight). The change-over of color and polymer was again completed very quickly in all the tests.

EXAMPLE 4

Tests on extruders produced equally good results; in the case of venting extruders, the vent tubes had to be closed beforehand.

The tests were carried out on the following injection-molding machines and extruders:

Arburg 221-55-250
screws: φ25
amount of material used before: 2 kg purging aid+-Rozylit
time required before: 30 mins.
with cleaning preparation: 0.5 kg
time required: 7 mins.

Arburg 270-210-500
screws: φ30
amount of material used before: 3 kg purging aid+-Rozylit
time required before: 40 mins.
with cleaning preparation: 1 kg
time required: 10 mins.

Krauss-Maffai 160-600A
screws: φ45
amount of material used before: 10 kg purging aid+-Rozylit
time required before: 50 mins.
with cleaning preparation: 2 kg
time required: 15 mins.

Bypass-Rheograph
screw: φ18
amount of material used before: 2 kg purging aid+-Rozylit
time required before: 30 mins.
with cleaning preparation: 0.5 kg
time required: 10 mins.

Stork Extruder
screw: φ20
amount of material used before: 3 kg purging aid+-Rozylit
time required before: 45 mins.
with cleaning preparation: 1 kg
time required: 10 mins.

We claim:

1. A process for cleaning machines for processing plastics, characterized in that the machine is charged with a cleaning preparation consisting essentially of a powder-form, acrylonitrile/butadiene/styrene polymer, said polymer containing about 20 to 80% by weight water while remaining in the powdered form.

2. The process of claim 1, wherein the acrylonitrile/butadiene/styrene polymer is introduced to the machine in combination with a plastic which is to be processed by the machine.

3. The process of claim 2, wherein the amount of acrylonitrile/butadiene/styrene to be combined with the plastic is about 0.5 to 10% by weight of the plastic to be processed by the machine.

4. The process of claim 1, wherein said acrylonitrile/butadiene/styrene polymer has a pH of about 7 to 14.

5. A process as claimed in claim 2, wherein said machines are kneaders, extruders and injection-molding machines.

6. A process for cleaning machines for processing plastics, characterized in that the machine is charged with a cleaning preparation consisting essentially of a powder-form, acrylonitrile/butadiene/styrene polymer containing about 40–60% by weight water while remaining in powdered form.

* * * * *

UNITED STATES PATENT AND TRADEMARK OFFICE
CERTIFICATE OF CORRECTION

PATENT NO. : 5,427,623
DATED : June 27, 1995
INVENTOR(S) : Schumann et al

It is certified that error appears in the above-indentified patent and that said Letters Patent is hereby corrected as shown below:

In the "References Cited" section on the cover page of the patent, in the U.S. PATENT DOCUMENTS subsection, "4,302,371 11/1981 Gurck et al." should read -- 4,302,377 11/1981 Gurak et al.--; "4,976,788 12/1990 Nohe et al." should read -- 4,976,788 12/1990 Nohr et al.--. Also in the U.S. PATENT DOCUMENTS subsection, the following document should be inserted.

--3,790,488  2/1974  Hirokazu Iino........252/89--

In the "References Cited" section, in the FOREIGN PATENT DOCUMENTS subsection, the following document should be inserted.

--0234529  9/1987  Europe--

UNITED STATES PATENT AND TRADEMARK OFFICE
CERTIFICATE OF CORRECTION

PATENT NO. : 5,427,623
DATED : June 27, 1995
INVENTOR(S) : Schumann et al

It is certified that error appears in the above-indentified patent and that said Letters Patent is hereby corrected as shown below:

In the "References Cited" section, in the OTHER PUBLICATIONS subsection, the following documents should be inserted.

PATENT ABSTRACTS OF JAPAN, vol. 13, no. 431 (C-640)(3779), 26 September, 1989, & JP-A-1 167 353 (ASAHI CHEMICAL INDUSTRIES CO. LTD.) 3 July, 1989.

DERWENT JAPANESE PATENTS REPORT, Section Ch. vol. 91, no. 06, 27 March, 1991; Derwent Publications Ltd., London, GB; Class A, p. 24, AN 91-041139/06 & JP-A-2 308 900 (ASAHI CHEMICAL INDUSTRIES K.K.) 21 December, 1990.

INTERNATIONAL POLYMER SCIENCE AND TECHNOLOGY, Bd. 12, Nr. 12; December, 1985; SHAWBURY GB, pp. 33-37; T. YOKOYAMA AND Y. SAKAI: 'MOULD-CLEANING METHODS, MOULDING CLEANING RUBBERS'.

In column 4, claim 5, line 1, "claim 2" should be --claim 1--.

Signed and Sealed this

Twenty-fourth Day of September, 1996

Attest:

BRUCE LEHMAN

Attesting Officer     Commissioner of Patents and Trademarks